US012629775B2

(12) United States Patent
Masuda et al.

(10) Patent No.: US 12,629,775 B2
(45) Date of Patent: May 19, 2026

(54) LASER WELDING METHOD

(71) Applicants: Kabushiki Kaisha Toshiba, Tokyo (JP); Toshiba Electronic Devices & Storage Corporation, Tokyo (JP)

(72) Inventors: Lisa Masuda, Yokohama Kanagawa (JP); Ryuichi Togawa, Tokyo (JP); Takashi Obara, Yokohama Kanagawa (JP)

(73) Assignees: Kabushiki Kaisha Toshiba, Kawasaki (JP); Toshiba Electronic Devices & Storage Corporation, Kawasaki (JP)

( * ) Notice: Subject to any disclaimer, the term of this patent is extended or adjusted under 35 U.S.C. 154(b) by 631 days.

(21) Appl. No.: 18/168,471

(22) Filed: Feb. 13, 2023

(65) Prior Publication Data

US 2023/0302576 A1 Sep. 28, 2023

(30) Foreign Application Priority Data

Mar. 23, 2022 (JP) ................................. 2022-046319

(51) Int. Cl.
*B23K 26/244* (2014.01)
*B23K 26/22* (2006.01)
*B23K 26/60* (2014.01)

(52) U.S. Cl.
CPC ............ *B23K 26/244* (2015.10); *B23K 26/22* (2013.01); *B23K 26/60* (2015.10)

(58) Field of Classification Search
CPC ........ B23K 26/21; B23K 26/22; B23K 26/60; B23K 26/244
See application file for complete search history.

(56) References Cited

U.S. PATENT DOCUMENTS 6,573,001 B1 6/2003 Shinohara et al.
7,312,417 B2 * 12/2007 Becker ................... B23K 26/60
                                                    219/121.64

(Continued)

FOREIGN PATENT DOCUMENTS

CN 1285956 A 2/2001
CN 109719388 A 5/2019

(Continued)

OTHER PUBLICATIONS

Office Action issued in Chinese Patent Application No. 202310134258. X, dated Jun. 14, 2025 in 16 pages.

*Primary Examiner* — Lorne E Meade
(74) *Attorney, Agent, or Firm* — Knobbe, Martens, Olson & Bear, LLP

(57) ABSTRACT

A laser welding method according to an embodiment includes a preparation process and a welding process. The preparation process includes preparing a temporarily-welded member that includes multiple connection portions by temporarily welding a second member to a first member. The welding process includes welding the second member to the first member by irradiating a laser beam on the temporarily-welded member. In the welding process, a first process is performed, after which a second process is performed. The first process includes irradiating a laser beam from a pre-scribed position to a second connection portion, wherein the second connection portion is adjacent to a first connection portion, and the prescribed position is between the first connection portion and the second connection portion. The second process includes irradiating a laser beam from the first connection portion to the prescribed position.

5 Claims, 6 Drawing Sheets

(56)          References Cited

U.S. PATENT DOCUMENTS

| 7,968,817 B2 * | 6/2011 | Freitag ................. B23K 26/211 |
| | | 429/185 |
| 10,549,388 B2 * | 2/2020 | Fujimoto ............... B23K 28/02 |
| 2010/0326967 A1 | 12/2010 | Freitag et al. |
| 2020/0030914 A1 | 1/2020 | Masuda et al. |

FOREIGN PATENT DOCUMENTS

| CN | 110756990 A | 2/2020 | |
| JP | S63-70490 | 3/1988 | |
| JP | 2009241116 A * | 10/2009 | ............. B23K 11/11 |
| JP | 2014-205148 | 10/2014 | |
| JP | 2015-138701 | 7/2015 | |

* cited by examiner

LASER WELDING METHOD

CROSS-REFERENCE TO RELATED APPLICATIONS

This application is based upon and claims the benefit of priority from Japanese Patent Application No. 2022-046319, filed on Mar. 23, 2022; the entire contents of which are incorporated herein by reference.

FIELD

Embodiments described herein relate generally to a laser welding method.

BACKGROUND

There is a laser welding method that welds multiple members by irradiating a laser beam. In the laser welding method, for example, multiple members are joined by performing temporary welding in which connection portions are formed by welding portions of the weld portion of the members, after which main welding is performed to weld the entire weld portion. In the main welding, for example, the entire weld portion is welded by continuously irradiating a laser beam from one end to the other end of the weld portion.

In such a laser welding method, there are cases where a gap occurs between the multiple members after the temporary welding. When the main welding is performed by continuously irradiating a laser beam from the one end of the connection portion toward the other end of the connection portion in a state in which such a gap exists, there are cases where joining defects occur due to a large deflection of the members caused by the gap at the periphery of the other end of the connection portion.

DETAILED DESCRIPTION

Figure 1A:
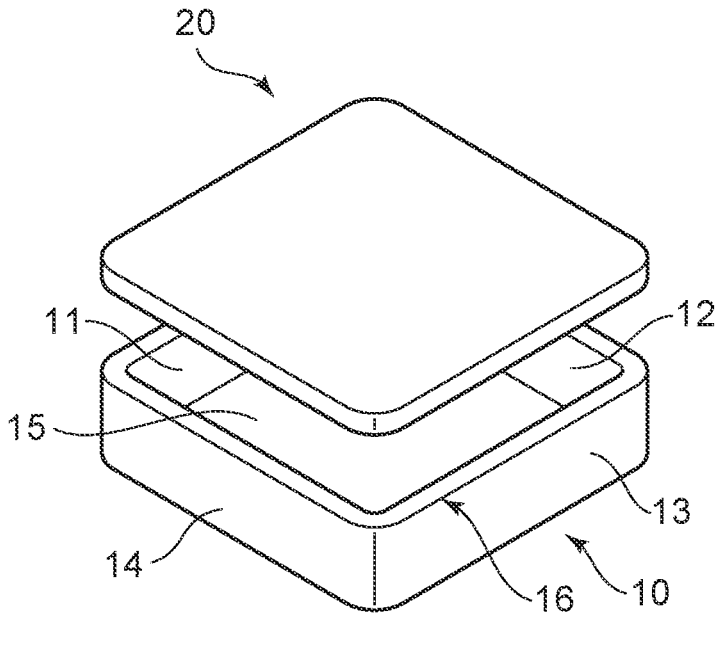
FIGS. 1A and 1B are perspective views illustrating a laser welding method according to an embodiment.

A laser welding method according to an embodiment welds a second member to a first member by irradiating a laser beam. The laser welding method according to the embodiment includes a preparation process and a welding process. The preparation process includes preparing a temporarily-welded member that includes multiple connection portions by temporarily welding the second member to the first member. The welding process includes welding the second member to the first member by irradiating a laser beam on the temporarily-welded member. In the welding process, a first process is performed, after which a second process is performed. The first process includes irradiating a laser beam from a prescribed position to a second connection portion among the multiple connection portions, wherein the second connection portion is adjacent to a first connection portion among the multiple connection portions, and the prescribed position is between the first connection portion and the second connection portion. The second process includes irradiating a laser beam from the first connection portion to the prescribed position.

Exemplary embodiments will now be described with reference to the drawings.

The drawings are schematic or conceptual; and the relationships between the thickness and width of portions, the proportional coefficients of sizes among portions, etc., are not necessarily the same as the actual values thereof. Furthermore, the dimensions and proportional coefficients may be illustrated differently among drawings, even for identical portions.

In the specification of the application and the drawings, components similar to those described in regard to a drawing thereinabove are marked with like reference numerals; and a detailed description is omitted as appropriate.

Figure 1B:
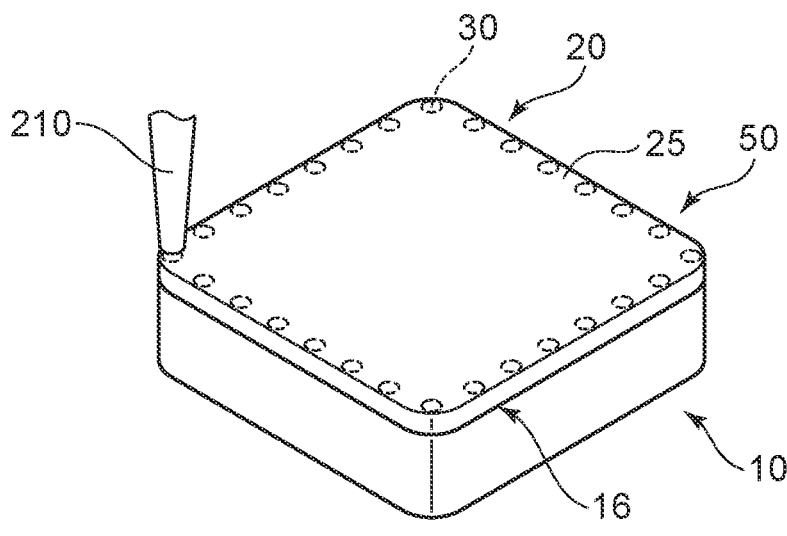

FIGS. 1A and 1B are perspective views illustrating a laser welding method according to an embodiment.

Figure 2A:
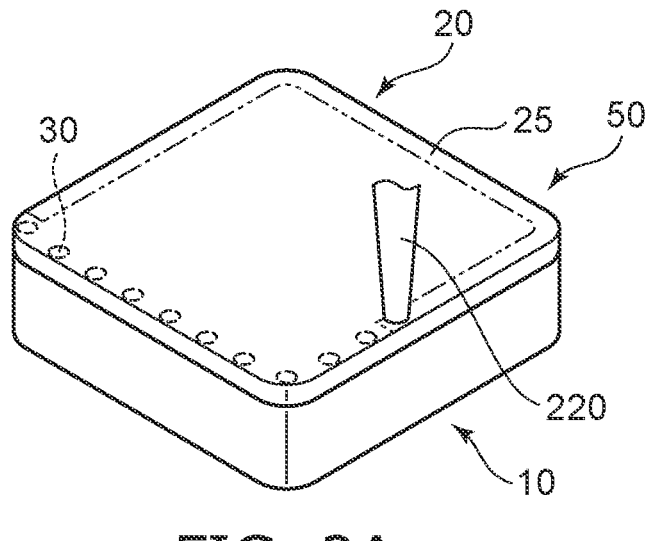
FIGS. 2A and 2B are perspective views illustrating the laser welding method according to the embodiment.
Figure 2B:
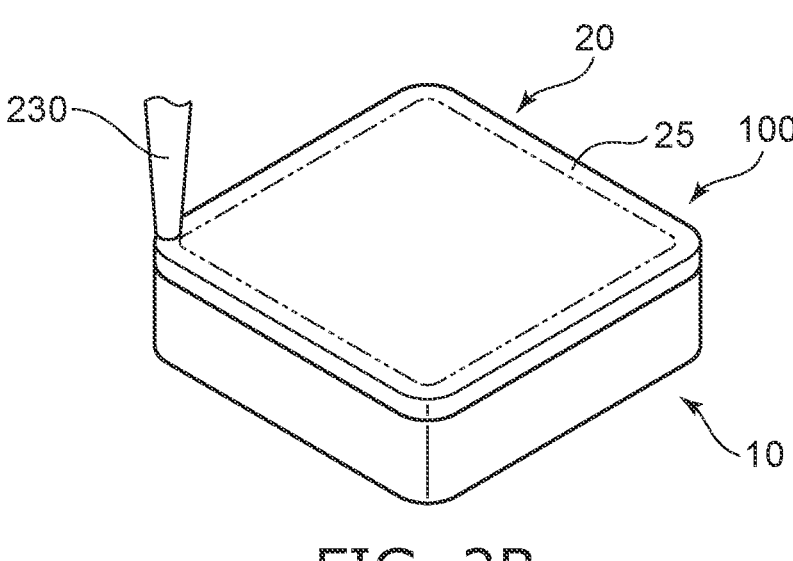

FIGS. 2A and 2B are perspective views illustrating the laser welding method according to the embodiment.

Figure 3:
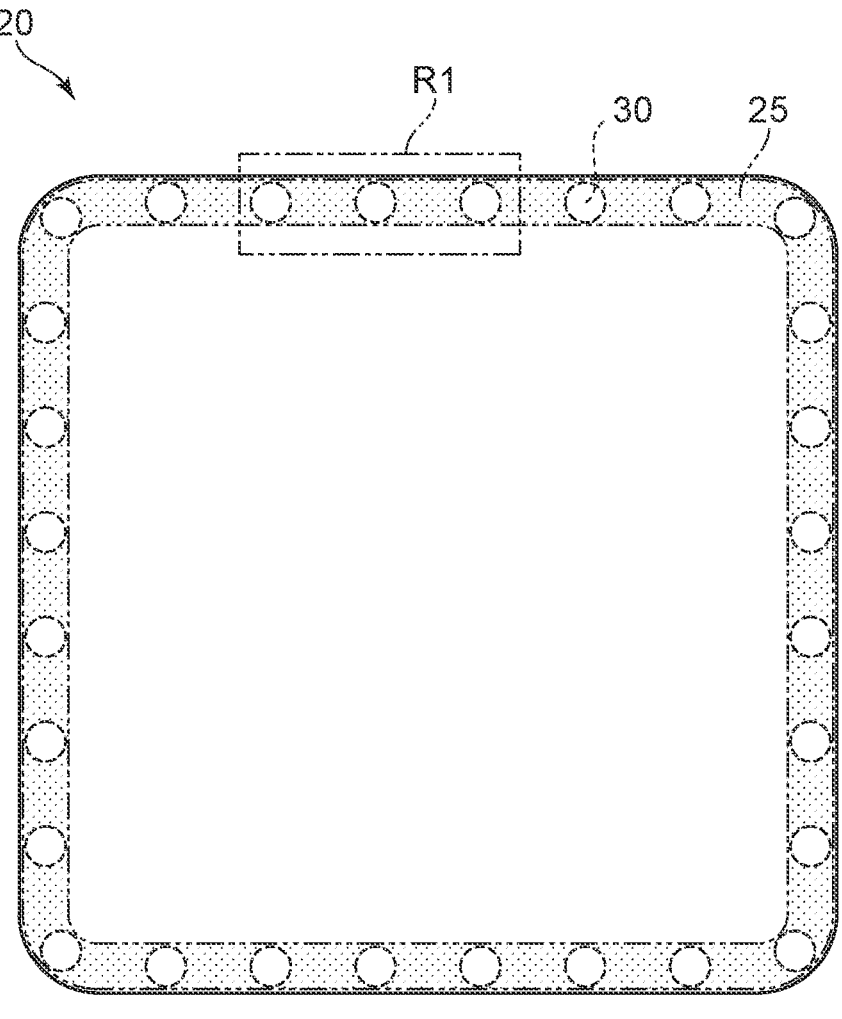
FIG. 3 is a plan view illustrating a weld portion of the laser welding method according to the embodiment.

FIG. 3 is a plan view illustrating a weld portion of the laser welding method according to the embodiment.

As illustrated in FIG. 1A, FIG. 1B, FIG. 2A, and FIG. 2B, the laser welding method according to the embodiment includes a preparation process, a welding process, and a planarizing process.

In the laser welding method according to the embodiment, first, the preparation process is performed. In the preparation process, first, a first member 10 and a second member 20 that are to be welded are prepared as illustrated in FIG. 1A.

The first member 10 and the second member 20 include, for example, at least one of aluminum, magnesium, or copper. The material of the second member 20 may be the same as or different from the material of the first member 10.

The first member 10 is, for example, a housing that has an opening part 16. For example, the first member 10 has a substantially rectangular box-shaped structure that is open upward. The first member 10 includes, for example, a first side surface part 11, a second side surface part 12, a third side surface part 13, a fourth side surface part 14, and a bottom surface part 15. The bottom surface part 15 is positioned at the bottom part of the first member 10. The first side surface part 11, the second side surface part 12, the third side surface part 13, and the fourth side surface part 14 each are upright parts that rise upward from the bottom surface part 15. The first side surface part 11 and the third side surface part 13 face each other. The second side surface part 12 and the fourth side surface part 14 face each other. For example, the first member 10 has the opening part 16 formed of the upper end of the first side surface part 11, the upper end of the second side surface part 12, the upper end of the third side surface part 13, and the upper end of the fourth side surface part 14.

The second member 20 is, for example, a lid that covers the opening part 16 of the first member 10. For example, the second member 20 has a flat-plate structure. As illustrated in FIG. 3, the second member 20 includes a weld portion 25. In FIG. 3, the weld portion 25 is shown by cross hatching. The weld portion 25 is the portion that is welded (joined) with the first member 10 in the welding process. For example, the weld portion 25 is the portion on which a laser beam 220 is irradiated in the welding process. The weld portion 25 is located in a portion of the second member 20 overlapping the first member 10. In the example, the weld portion 25 is located at the position at which the opening part 16 and the second member 20 (the lid) overlap.

Although the first member 10 is a housing and the second member 20 is a lid in the example described herein, the shapes of the first and second members 10 and 20 are not limited to such shapes. It is sufficient that the shapes of the first and second members 10 and 20 can be welded by laser irradiation. For example, the first member 10 and the second member 20 each may have flat plate shapes.

Then, in the preparation process as illustrated in FIG. 1B, a temporarily-welded member 50 is prepared in which the second member 20 is temporarily welded to the first member 10. The temporarily-welded member 50 has a structure in which the second member 20 is welded to the first member 10 via multiple connection portions 30 provided along the weld portion 25. That is, in the temporarily-welded member 50, the first member 10 and the second member 20 are welded (joined) via the multiple connection portions 30.

Herein, "temporary welding" refers to the welding performed before the welding (the main welding) of the welding process described below. In the temporary welding, for example, the multiple connection portions 30 are formed by melting the second member 20 at multiple spots at which a laser beam 210 is irradiated by irradiating the laser beam 210 on the multiple spots of the second member 20 along the weld portion 25 in a state in which the second member 20 is overlaid on the first member 10.

When the first member 10 is a housing including the opening part 16 and the second member 20 is a lid, for example, it is favorable for the temporarily-welded member to be prepared by temporarily welding the second member 20 (the lid) via the multiple connection portions 30 to the entire perimeter of the opening part 16 of the first member 10 (the housing) in the preparation process. In such a case, for example, the connection portions 30 can be provided at uniform spacing around the entire perimeter of the opening part 16 of the first member 10 (the housing) by irradiating the laser beam 210 at uniform spacing around the entire perimeter of the opening part 16 of the first member 10 (the housing) in the preparation process. The spacing between the multiple connection portions 30 may not be uniform spacing.

The laser device that irradiates the laser beam 210 used in the temporary welding of the preparation process may be, for example, a pulsed laser that produces a pulsed output at a certain repetition frequency (pulse width) or may be a CW (Continuous Wave) laser that continuously produces a certain output. In the case of a pulsed laser, the pulse width is, for example, several femtoseconds, several picoseconds, or several milliseconds. The wavelength of the laser beam 210 is, for example, not less than 300 nm and not more than 5000 nm.

Then, in the laser welding method according to the embodiment, the welding process is performed. The welding process is performed after the preparation process. In the welding process as illustrated in FIG. 2A, the second member 20 is welded to the first member 10 by irradiating the laser beam 220 on the temporarily-welded member 50 along the weld portion 25. Thereby, for example, as illustrated in FIG. 2B, a sealed member 100 is manufactured in which the opening part 16 of the first member 10 (the housing) is sealed by the second member 20 (the lid). The welding process is described below.

The laser device that irradiates the laser beam 220 used in the welding process may be, for example, a pulsed laser or a CW laser. In the case of a pulsed laser, the pulse width is, for example, several femtoseconds or several picoseconds. The wavelength of the laser beam 220 is, for example, not less than 300 nm and not more than 1070 nm. The laser beam 220 that is used in the welding process may be the same as or different from the laser beam 210 used in the temporary welding of the preparation process.

Then, in the laser welding method according to the embodiment, the planarizing process is performed. The planarizing process is performed after the welding process. In the planarizing process as illustrated in FIG. 2B, the surface of the weld portion 25 is planarized after the welding process by irradiating a laser beam 230 along the weld portion 25 of the sealed member 100. The planarizing process is performed as necessary and is omissible.

The laser device that irradiates the laser beam 230 used in the planarizing process may be, for example, a pulsed laser or a CW laser. In the case of a pulsed laser, the pulse width is, for example, several femtoseconds or several picoseconds. The wavelength of the laser beam 230 is, for example, not less than 300 nm and not more than 1070 nm. The laser beam 230 that is used in the planarizing process may be the same as or different from the laser beam 210 used in the temporary welding of the preparation process. The laser beam 230 that is used in the planarizing process may be the same as or different from the laser beam 220 used in the welding process.

The welding process will now be described in more detail.

Figure 4:
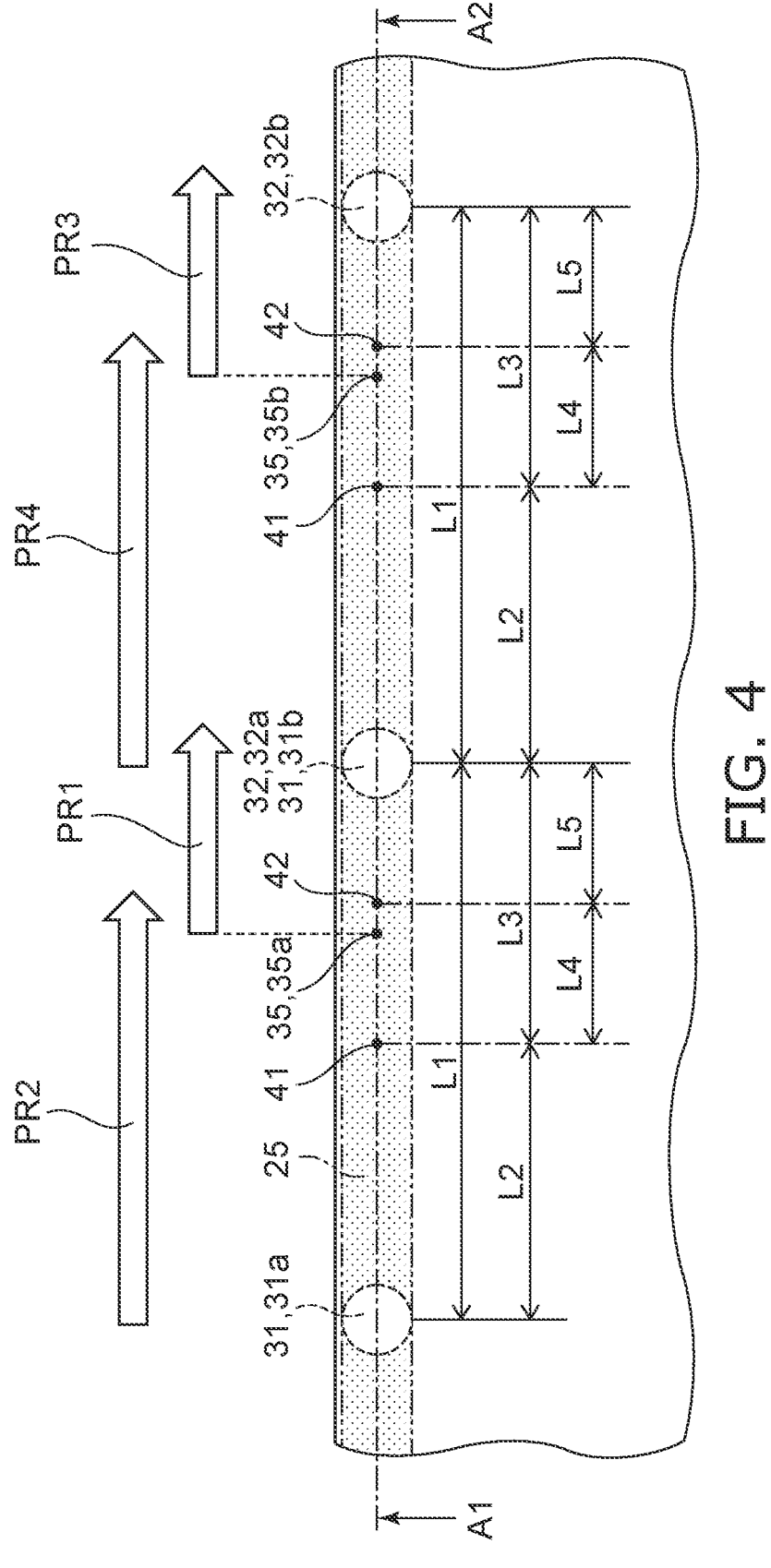
FIG. 4 is a plan view illustrating the welding process of the laser welding method according to the embodiment.

FIG. 4 is a plan view illustrating the welding process of the laser welding method according to the embodiment.

FIG. 4 is an enlarged view of region R1 shown in FIG. 3.

In the welding process as illustrated in FIG. 4, the welding is divided into two processes, i.e., a first process and a second process, that are performed between two adjacent connection portions 30. In FIG. 4, white arrows with black outlines PR1 and PR3 show the first processes; and white arrows with black outlines PR2 and PR4 show the second processes.

Two mutually-adjacent connection portions 30 among the multiple connection portions 30 are taken as a first connection portion 31 and a second connection portion 32. A first connection portion 31a and a second connection portion 32a are adjacent to each other. A first connection portion 31b and a second connection portion 32b are adjacent to each other. The second connection portion 32a also serves as the first connection portion 31b.

In the first process as illustrated by PR1 and PR3 in FIG. 4, the laser beam 220 is irradiated to the second connection portion 32 from a prescribed position 35 between the first connection portion 31 and the second connection portion 32. In the first process, for example, the laser beam 220 is continuously irradiated from the prescribed position 35 toward the second connection portion 32. In the first process, the laser beam 220 is irradiated from the prescribed position 35 to at least a position overlapping the second connection portion 32. In the first process, for example, it is favorable to irradiate the laser beam 220 from the prescribed position 35 to a position past the second connection portion 32 (i.e., a position at the side opposite to the prescribed position 35 when referenced to the second connection portion 32).

In the second process as illustrated by PR2 and PR4 in FIG. 4, the laser beam 220 is irradiated from the first connection portion 31 to the prescribed position 35. In the second process, for example, the laser beam 220 is continuously irradiated from the first connection portion 31 toward the prescribed position 35. In the second process, the laser beam 220 is irradiated to the prescribed position 35 from at least a position overlapping the first connection portion 31. In the second process, it is favorable to irradiate the laser beam 220 from a position past the first connection portion 31 (i.e., a position at the side opposite to the prescribed position 35 when referenced to the first connection portion 31) to a position past the prescribed position 35 (i.e., a position at the side opposite to the first connection portion 31 when referenced to the prescribed position 35). For example, a portion of the region on which the laser beam 220 is irradiated in the second process overlaps a portion of the region on which the laser beam 220 is irradiated in the first process.

A distance L1 between the first connection portion 31 and the second connection portion 32 is, for example, not less than 2 mm and not more than 10 mm. For example, the prescribed position 35 is positioned between a first midpoint 41 and a second midpoint 42. The first midpoint 41 is positioned midway between the first connection portion 31 and the second connection portion 32. That is, a distance L2 between the first connection portion 31 and the first midpoint 41 is equal to a distance L3 between the first midpoint 41 and the second connection portion 32. The distance L2 and the distance L3 are half of the distance L1. The second midpoint 42 is positioned midway between the first midpoint 41 and the second connection portion 32. That is, a distance L4 between the first midpoint 41 and the second midpoint 42 is equal to a distance L5 between the second midpoint 42 and the second connection portion 32. The distance L4 and the distance L5 are half of the distance L3.

In the welding process, the first process is performed, and then the second process is performed. In the welding process, at least the irradiation of the laser beam 220 at the position shown by PR1 (the first process) is performed before the irradiation of the laser beam 220 at the position shown by PR2 (the second process). In the welding process, at least the irradiation of the laser beam 220 at the position shown by PR3 (the first process) is performed before the irradiation of the laser beam 220 at the position shown by PR4 (the second process).

In the welding process, for example, the irradiation of the laser beam 220 at the position shown by PR1 (the first process) is performed, and then the irradiation of the laser beam 220 at the position shown by PR2 (the second process) is performed, and then the irradiation of the laser beam 220 at the position shown by PR3 (the first process) is performed, and then the irradiation of the laser beam 220 at the position shown by PR4 (the second process) is performed. That is, in the welding process, for example, the first process and the second process are repeatedly performed alternately.

Or, in the welding process, for example, the irradiation of the laser beam 220 at the position shown by PR1 (the first process) may be performed, and then the irradiation of the laser beam 220 at the position shown by PR3 (the first process) may be performed, and then the irradiation of the laser beam 220 at the position shown by PR2 (the second process) may be performed, and then the irradiation of the laser beam 220 at the position shown by PR4 (the second process) may be performed. That is, in the welding process, for example, the second processes may be collectively performed after collectively performing the first processes.

When the first member 10 is a housing including the opening part 16 and the second member 20 is a lid, for example, in the welding process, it is favorable to weld the second member 20 (the lid) around the entire perimeter of the opening part 16 of the first member 10 by repeating the first and second processes between all of the multiple connection portions 30 provided in the entire perimeter of the opening part 16. In such a case as well, the first process and the second process may be repeatedly performed alternately, or the second processes may be collectively performed after collectively performing the first processes.

Effects of the laser welding method according to the embodiment will now be described.

Figure 5A:
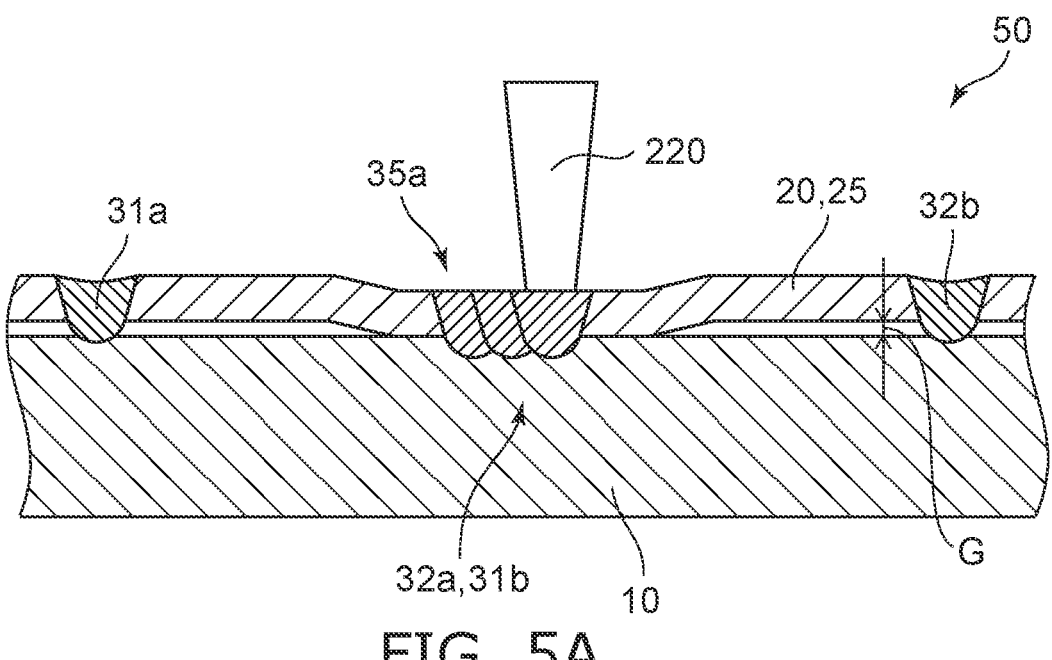
FIGS. 5A and 5B are cross-sectional views illustrating the welding process of the laser welding method according to the embodiment.
Figure 5B:
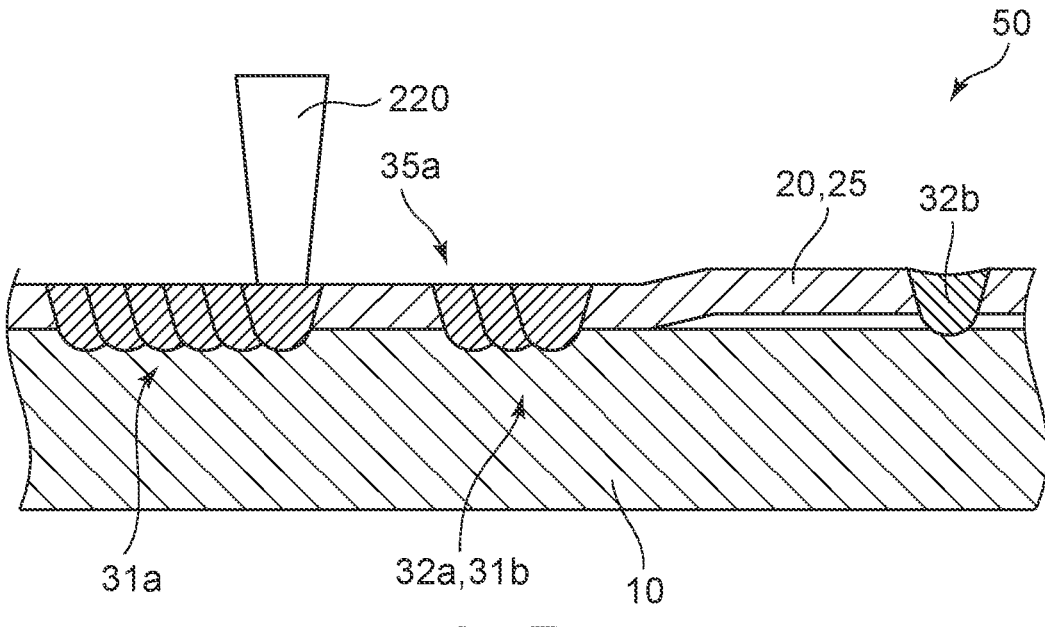

FIGS. 5A and 5B are cross-sectional views illustrating the welding process of the laser welding method according to the embodiment.

Figures 6A, 6B:
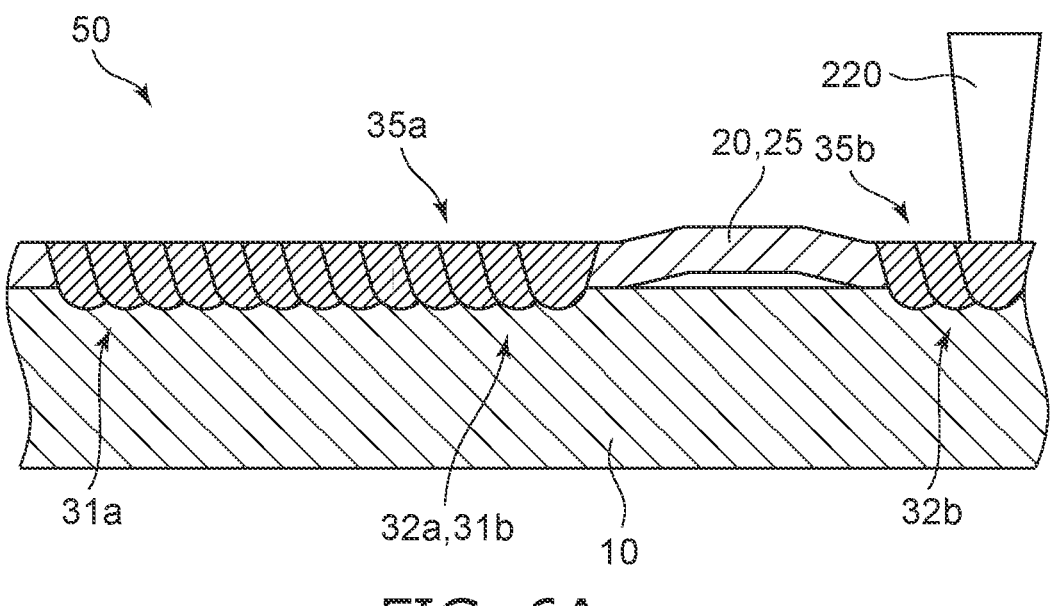
FIGS. 6A and 6B are cross-sectional views illustrating the welding process of the laser welding method according to the embodiment.

FIGS. 6A and 6B are cross-sectional views illustrating the welding process of the laser welding method according to the embodiment.

FIG. 5A, FIG. 5B, FIG. 6A, and FIG. 6B are cross-sectional views along line A1-A2 shown in FIG. 4.

FIG. 5A shows the irradiation of the laser beam 220 at the position shown by PR1 of FIG. 4 (the first process). FIG. 5B shows the irradiation of the laser beam 220 at the position shown by PR2 of FIG. 4 (the second process). FIG. 6A shows the irradiation of the laser beam 220 at the position shown by PR3 of FIG. 4 (the first process). FIG. 6B shows the irradiation of the laser beam 220 at the position shown by PR4 of FIG. 4 (the second process).

As illustrated in FIG. 5A, there are cases where a gap G occurs between the first member 10 and the second member 20 in the temporarily-welded member 50. The gap G is, for example, not less than 10 μm and not more than 50 μm.

In such a case, for example, if the laser beam 220 is continuously irradiated from the first connection portion 31a toward the second connection portion 32a in the welding process (the main welding), the deflection of the second member 20 caused by the gap G at the periphery of the second connection portion 32a may become large, and a joining defect may occur. Also, such a joining defect may occur at the periphery of the second connection portion 32 over the entire region of the weld portion 25.

In contrast, in the laser welding method according to the embodiment, first, as illustrated in FIG. 5A, the first process is performed in which the laser beam 220 is irradiated to the second connection portion 32a from a prescribed position 35a between the first connection portion 31a and the second connection portion 32a. Then, after the first process as illustrated in FIG. 5B, the second process is performed in which the laser beam 220 is irradiated from the first connection portion 31a to the prescribed position 35a.

Thus, by performing the irradiation of the laser beam 220 from the prescribed position 35a to the second connection portion 32a (the first process) before the irradiation of the laser beam 220 from the first connection portion 31a to the prescribed position 35a (the second process), the large deflection of the second member 20 caused by the gap G at the periphery of the second connection portion 32a can be suppressed. Accordingly, joining defects can be suppressed.

In the laser welding method according to the embodiment as illustrated in FIG. 6A, the first process is performed in which the laser beam 220 is irradiated to the second connection portion 32b from a prescribed position 35b between the first connection portion 31b and the second connection portion 32b. Then, after the first process as illustrated in FIG. 6B, the second process is performed in which the laser beam 220 is irradiated from the first connection portion 31b to the prescribed position 35b.

Thus, by repeatedly performing the first and second processes, the large deflection of the second member 20 caused by the gap G can be suppressed at the peripheries of all of the second connection portions 32. Accordingly, joining defects can be suppressed over the entire region of the weld portion 25.

Because the prescribed position 35 is positioned between the first midpoint 41 (see FIG. 4) and the second midpoint 42 (see FIG. 4), the large deflection of the second member 20 caused by the gap G at the periphery of the second connection portion 32*a* when performing the first process can be suppressed because the length that the laser beam 220 is irradiated in the first process is not too long. Accordingly, joining defects can be suppressed.

When the welding process is divided into the first and second processes, an unevenness may be formed in the weld portion 25 by the welding process. Therefore, by performing the planarizing process after the welding process in the laser welding method according to the embodiment, the surface of the weld portion 25 can be planarized by the planarizing process after the welding process even when an unevenness is formed in the weld portion 25 by the welding process.

When the first member 10 is a housing including the opening part 16 and the second member 20 is a lid, the sealed member 100 in which the opening part 16 of the first member 10 is sealed with the second member 20 can be easily manufactured by preparing the temporarily-welded member 50 in which the second member 20 (the lid) is temporarily welded via the multiple connection portions 30 around the entire perimeter of the opening part 16 of the first member 10 (the housing) in the preparation process and by welding the second member 20 (the lid) around the entire perimeter of the opening part 16 by repeating the first and second processes between all of the multiple connection portions 30 located in the entire perimeter of the opening part 16 in the welding process.

Thus, according to the embodiment, a laser welding method is provided in which joining defects can be suppressed.

For example, the laser welding method according to the embodiment is favorably used to manufacture devices such as secondary batteries, heat exchangers such as heat sinks or the like, gas generators used in airbags or the like, rotors for air conditioners, etc.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions. Embodiments described above can be implemented in combination with each other.

What is claimed is:

1. A laser welding method of welding a second member to a first member by irradiating a laser beam, the method comprising:

a preparation process of preparing a temporarily-welded member by temporarily welding the second member to the first member, the temporarily-welded member including a plurality of connection portions; and a welding process of welding the second member to the first member by irradiating the laser beam on the temporarily-welded member, the welding process including:

a first process of irradiating the laser beam from a prescribed position to a second connection portion among the plurality of connection portions, the second connection portion being adjacent to a first connection portion among the plurality of connection portions, the prescribed position being between the first connection portion and the second connection portion, and a second process of irradiating the laser beam from the first connection portion to the prescribed position after the first process, wherein the prescribed position is positioned between a first midpoint and a second midpoint, the first midpoint is positioned midway between the first connection portion and the second connection portion, and the second midpoint is positioned midway between the first midpoint and the second connection portion.

2. The method according to claim 1, wherein the preparation process includes preparing the temporarily-welded member by forming the plurality of connection portions by irradiating the laser beam on a plurality of spots of the second member to melt the second member at the plurality of spots in a state in which the second member overlaps the first member.

3. The method according to claim 1, further comprising:

a planarizing process of planarizing a surface of a portion welded in the welding process by irradiating the laser beam after the welding process.

4. The method according to claim 1, wherein the first member is a housing having an opening part, the second member is a lid covering the opening part, and the housing and the lid are welded at a position at which the opening part and the lid overlap.

5. The method according to claim 4, wherein the preparation process includes preparing the temporarily-welded member so that the lid is temporarily welded via the plurality of connection portions to an entire perimeter of the opening part, and the welding process includes welding the lid to the entire perimeter of the opening part by repeating the first and second processes between all of the plurality of connection portions provided in the entire perimeter of the opening part.

* * * * *